(12) United States Patent
Yamaguchi

(10) Patent No.: US 8,928,263 B2
(45) Date of Patent: Jan. 6, 2015

(54) CONTROL APPARATUS IN MOTOR DRIVE SYSTEM AND METHOD OF CONTROLLING MOTOR DRIVE SYSTEM

(71) Applicant: Honda Motor Co., Ltd., Tokyo (JP)

(72) Inventor: Noritaka Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 117 days.

(21) Appl. No.: 13/857,154

(22) Filed: Apr. 5, 2013

(65) Prior Publication Data
US 2013/0342137 A1 Dec. 26, 2013

(30) Foreign Application Priority Data
Jun. 26, 2012 (JP) .................................. 2012-143426

(51) Int. Cl.
*H02P 1/04* (2006.01)
*H02P 23/00* (2006.01)
*H02P 6/00* (2006.01)

(52) U.S. Cl.
CPC .............. *H02P 6/001* (2013.01); *Y02T 10/7241* (2013.01); *Y02T 10/7225* (2013.01)
USPC ...................................... 318/400.17; 318/808

(58) Field of Classification Search
CPC ......................... Y02T 10/7225; B60L 2240/36
USPC ............................................. 318/400.17, 808
See application file for complete search history.

(56) References Cited

U.S. PATENT DOCUMENTS

| | | | |
|---|---|---|---|
| 6,244,061 B1 * | 6/2001 | Takagi et al. ................... | 62/229 |
| 6,367,273 B2 * | 4/2002 | Takagi et al. ................... | 62/230 |
| 8,450,962 B2 * | 5/2013 | Wu et al. ........................ | 318/610 |
| 2014/0152215 A1 * | 6/2014 | DeFilippis ............... | 318/400.14 |
| 2014/0203748 A1 * | 7/2014 | TAKADA et al. ............ | 318/473 |
| 2014/0236410 A1 * | 8/2014 | Takizawa et al. .............. | 701/22 |

FOREIGN PATENT DOCUMENTS

| | | |
|---|---|---|
| JP | 3746334 B2 | 3/1998 |
| JP | 2001-157304 | 6/2001 |

* cited by examiner

*Primary Examiner* — Erick Glass
(74) *Attorney, Agent, or Firm* — Mori & Ward, LLP

(57) ABSTRACT

A control apparatus in a motor drive system includes a magnet temperature acquiring device and a step-up ratio determining device. The magnet temperature acquiring device is configured to estimate or detect a temperature of a permanent magnet provided in a rotor or a stator of a motor of the motor drive system. The motor drive system includes a power supplying device to output direct current voltage, and a voltage step-up device to increase, at a certain step-up ratio, the direct current voltage which is output from the power supplying device. The step-up ratio determining device is configured to determine the certain step-up ratio in accordance with the temperature of the permanent magnet estimated or detected by the magnet temperature acquiring device.

9 Claims, 6 Drawing Sheets

BACKGROUND ART

CONTROL APPARATUS IN MOTOR DRIVE SYSTEM AND METHOD OF CONTROLLING MOTOR DRIVE SYSTEM

CROSS-REFERENCE TO RELATED APPLICATIONS

The present application claims priority under 35 U.S.C. §119 to Japanese Patent Application No. 2012-143426, filed Jun. 26, 2012, entitled "Control Apparatus In Motor Drive System." The contents of this application are incorporated herein by reference in their entirety.

BACKGROUND OF THE INVENTION

1. Field of the Invention

The present disclosure relates to a control apparatus in a motor drive system and a method of controlling the motor drive system.

2. Discussion of the Background

Motors serving as drive sources are provided in vehicles, such as hybrid electric vehicles (HEVs) and electric vehicles (EVs). FIG. 8 is a partial cross-sectional view of a permanent magnet field motor. A motor 50 illustrated in FIG. 8 includes a rotor 53 including multiple permanent magnets 51 provided around a rotating shaft in a concentric manner and a stator 57 including three-phase armatures 55 provided on an outer peripheral side of the rotor 53.

For example, refer to Japanese Patent No. 3746334.

When the motor 50 illustrated in FIG. 8 is operated at high temperature of the permanent magnets, demagnetization occurs in the permanent magnets 51 due to a demagnetizing field of phase current involved in the operation at high temperature. The occurrence of the demagnetization in the permanent magnets 51 may reduce the torque in the motor 50 to prevent the motor 50 from outputting a desired output. As a countermeasure against the problem, a method is proposed in which armature current is controlled so that the temperature (hereinafter referred to as a "magnet temperature") of the permanent magnets does not exceed an allowable maximum temperature. For example, a rotating electrical machine apparatus for a hybrid vehicle described in Japanese Unexamined Patent Application Publication No. 2001-157304 estimates the magnet temperature of the rotating electrical machine on the basis of data detected to be used in control of the hybrid vehicle or data calculated in the apparatus on the basis of the detected data and, if the magnet temperature is high, limits the armature current. Although the limitation of the armature current in the above manner results in a reduction in output from the motor although the limitation of the armature current in the above manner allows an increase in the magnet temperature to be inhibited to suppress the occurrence of the demagnetization in the permanent magnets.

As a countermeasure against a reduction in output from the motor due to the demagnetization of the permanent magnets, a method of performing so-called field weakening control is also proposed to control the armature current so as not to cause the demagnetization. However, the output efficiency is reduced in the field weakening control because field weakening current, which is a current component that does not contribute to or is difficult to contribute to an increase in torque, is supplied to the motor. Alternatively, a method is also proposed in which a permanent magnet containing a larger amount of a heavy rare earth element, such dysprosium (Dy) or terbium (Tb), is used to suppress the demagnetization. However, since the heavy rare earth element is rare, it is not desired to increase the amount of use of the heavy rare earth element.

SUMMARY OF THE INVENTION

According to one aspect of the present invention, a control apparatus in a motor drive system includes a magnet temperature acquiring device and a step-up ratio determining device. The magnet temperature acquiring device is configured to estimate or detect a temperature of a permanent magnet provided in a rotor or a stator of a motor of the motor drive system. The motor drive system includes a power supplying device to output direct current voltage, and a voltage step-up device to increase, at a certain step-up ratio, the direct current voltage which is output from the power supplying device. The step-up ratio determining device is configured to determine the certain step-up ratio in accordance with the temperature of the permanent magnet estimated or detected by the magnet temperature acquiring device.

According to another aspect of the present invention, in a method of controlling a motor drive system, a temperature of a permanent magnet provided in a rotor or a stator of a motor of the motor drive system is estimated or detected. The motor drive system includes a power supplying device to output direct current voltage, and a voltage step-up device to increase, at a certain step-up ratio, the direct current voltage which is output from the power supplying device. The certain step-up ratio is determined in accordance with the temperature of the permanent magnet.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
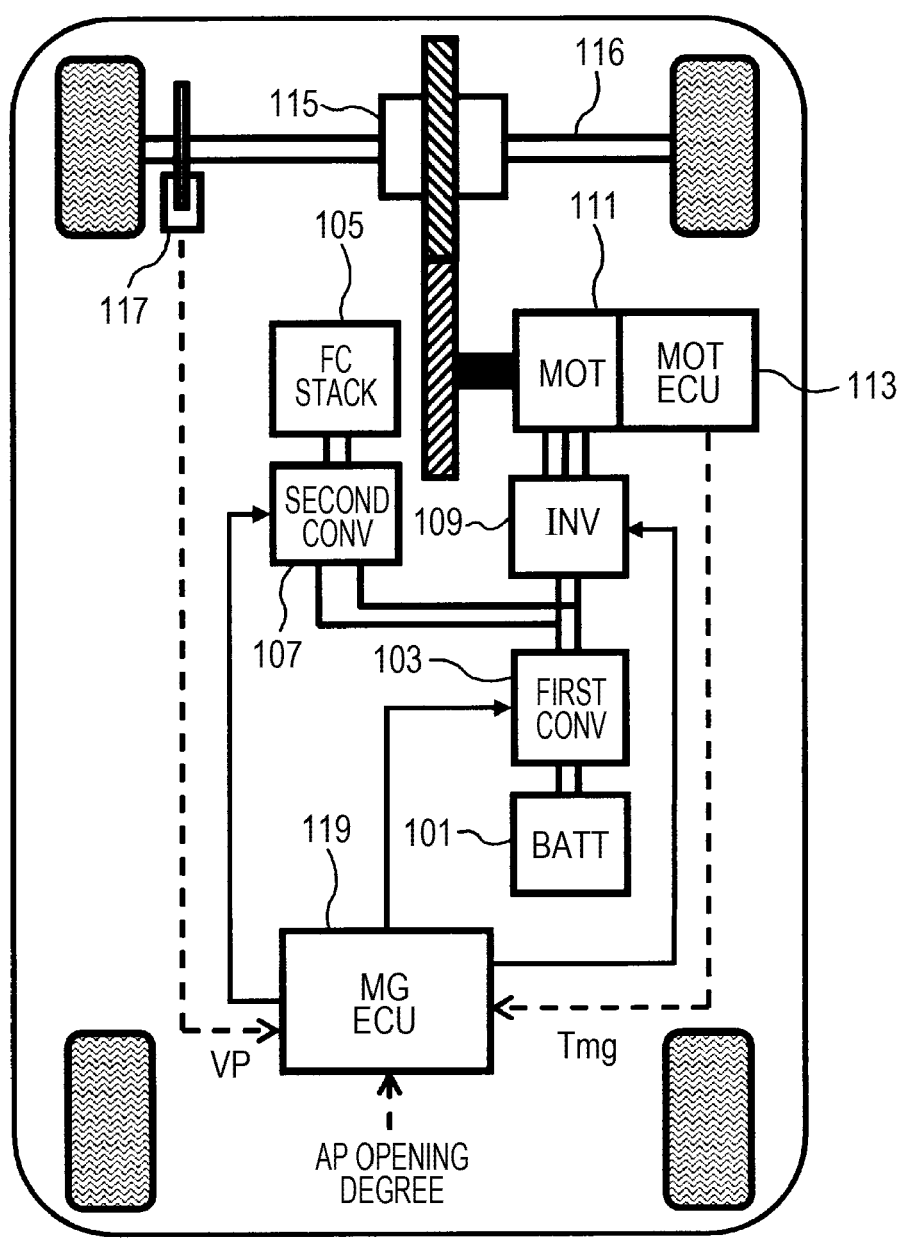
FIG. 1 is a block diagram illustrating an exemplary internal configuration of a vehicle using a motor as a drive source.

The embodiments will now be described with reference to the accompanying drawings, wherein like reference numerals designate corresponding or identical elements throughout the various drawings.

FIG. 1 is a block diagram illustrating an exemplary internal configuration of a vehicle using a motor as a drive source. The vehicle illustrated in FIG. 1 includes a battery (BATT) 101, a first converter (first CONV) 103, a fuel cell stack (FC stack) 105, a second converter (second CONV) 107, an inverter (INV) 109, a motor (MOT) 111, a motor electronic control unit (MOT ECU) 113, a gear box (hereinafter simply referred to as a "gear") 115, a vehicle speed sensor 117, and a management ECU (MG ECU) 119. Broken lines in FIG. 1 denote value data and solid lines in FIG. 1 denote control signals including the content of instructions.

Referring to FIG. 1, the battery 101 includes multiple storage cells connected in series to each other and supplies a high voltage of, for example, 100 V to 200 V. The storage cells are, for example, lithium-ion cells or nickel metal hydride cells. The first converter 103 increases the direct current (DC) voltage output from the battery 101. The first converter 103 operates at a step-up ratio described below supplied from the management ECU 119.

The FC stack 105 is one package in which multiple fuel cells are stacked and supplies DC voltage. The second converter 107 increases the DC voltage output from the FC stack 105. The second converter 107 operates at the step-up ratio described below supplied from the management ECU 119.

The inverter 109 converts the DC voltage increased by the first converter 103 or the second converter 107 into alternating current (AC) voltage to supply three-phase current to the motor 111. In addition, the inverter 109 converts AC voltage input into the motor 111 during regeneration operation into DC voltage to charge the battery 101 with the DC voltage. The inverter 109 operates in response to an INV instruction value described below supplied from the management ECU 119.

The motor 111 includes a rotor including multiple permanent magnets provided around a rotating shaft in a concentric manner and a stator including three-phase armatures provided on an outer peripheral side of the rotor. The motor 111 generates power used by the vehicle to drive. Torque generated in the motor 111 is transmitted to a drive shaft 116 via the gear 115. The rotor of the motor 111 is directly connected to the gear 115. The motor 111 operates as a power generator during regeneration braking and the battery 101 is charged with the power generated by the motor 111.

The motor ECU 113 controls the operation of the motor 111 in response to an instruction from the management ECU 119. The motor ECU 113 estimates the temperature (the magnet temperature) of the permanent magnets composing the rotor of the motor 111 from a certain heat model on the basis of the number of revolutions Nm and the torque of the motor 111, the voltage input into the motor 111, the temperature (water temperature) of cooling water for the motor 111 or the temperature (ATF temperature) of gear oil, and the temperature (winding temperature) of windings composing the armatures of the motor 111. The motor ECU 113 supplies a signal indicating the estimated magnet temperature Tmg to the management ECU 119.

The gear 115 is, for example, a five-speed type one-stage fixed gear. Accordingly, the gear 115 converts the driving power from the motor 111 into the number of revolutions and the torque at a certain transmission gear ratio and transmits the number of revolutions and the torque to the drive shaft 116. The vehicle speed sensor 117 detects a driving speed (a vehicle speed VP) of the vehicle on the basis of the number of revolutions of the drive shaft 116. A signal indicating the vehicle speed VP detected by the vehicle speed sensor 117 is supplied to the management ECU 119.

The management ECU 119 performs calculation of a request output based on an acceleration pedal opening degree (AP opening degree) corresponding to an acceleration operation by a driver of the vehicle and the vehicle speed VP, control of the inverter 109, the first converter 103, and the second converter 107, and so on. In addition, the management ECU 119 supplies an instruction concerning the operation of the motor 111 to the motor ECU 113. Furthermore, the management ECU 119 acquires the signal indicating the magnet temperature Tmg from the motor ECU 113. The management ECU 119 sets an operation mode of the motor 111 to any of an efficiency weighted mode, a step-up mode, and an output limited mode.

Figure 2:
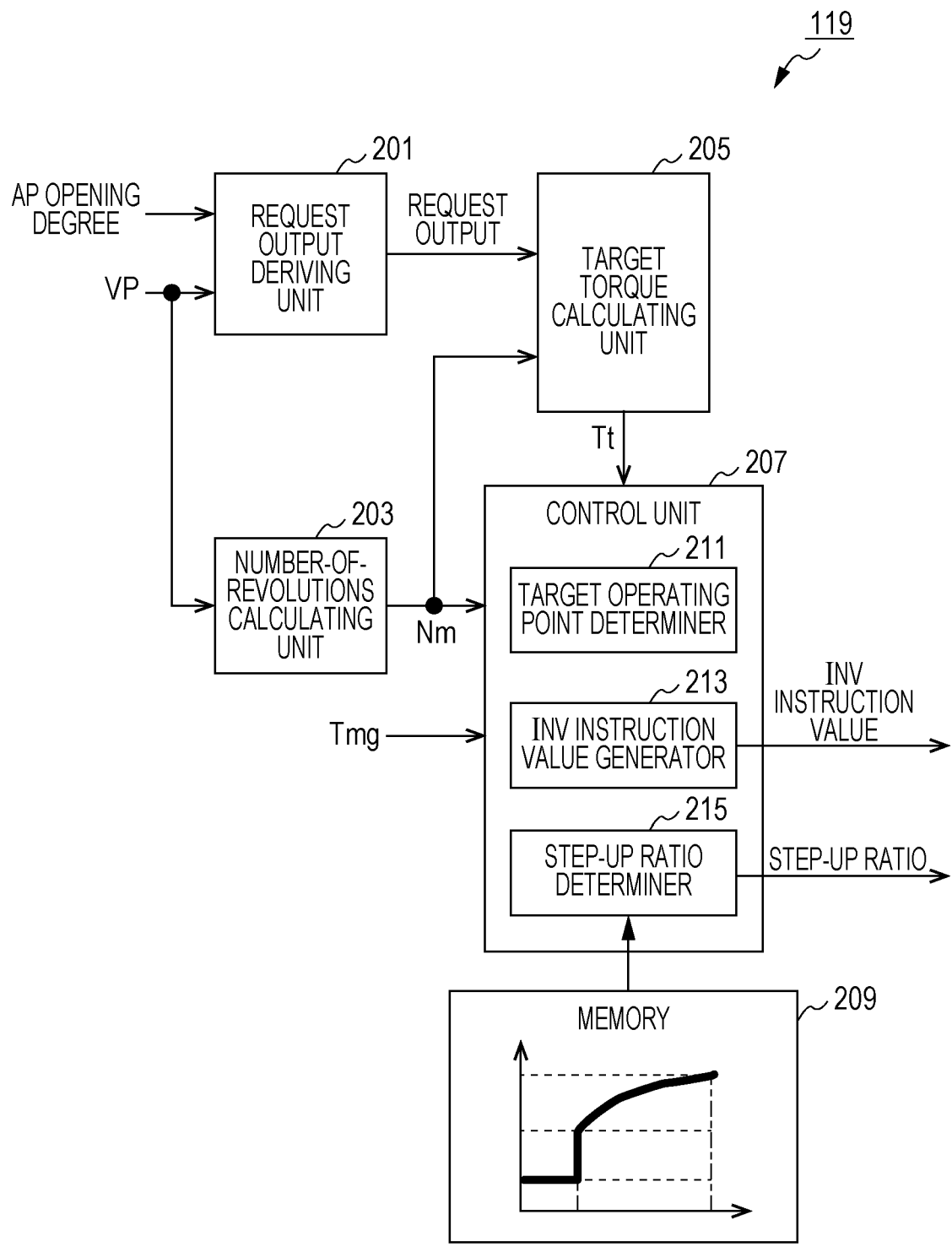
FIG. 2 is a block diagram illustrating an exemplary internal configuration of a management ECU.

FIG. 2 is a block diagram illustrating an exemplary internal configuration of the management ECU 119. Referring to FIG. 2, the management ECU 119 includes a request output deriving unit 201, a number-of-revolutions calculating unit 203, a target torque calculating unit 205, a control unit 207, and a memory 209.

The request output deriving unit 201 derives the output (request output) which the management ECU 119 requests from the motor 111 on the basis of the acceleration pedal opening degree (AP opening degree) and the vehicle speed VP. The number-of-revolutions calculating unit 203 calculates the number of revolutions Nm of the motor 111 from the vehicle speed VP. The target torque calculating unit 205 calculates a torque (target torque) Tt which the motor 111 aims to achieve on the basis of the request output derived by the request output deriving unit 201 and the number of revolutions Nm calculated by the number-of-revolutions calculating unit 203.

The target torque Tt calculated by the target torque calculating unit 205, the number of revolutions Nm calculated by the number-of-revolutions calculating unit 203, and the magnet temperature Tmg estimated by the motor ECU 113 are input into the control unit 207. The control unit 207 includes a target operating point determiner 211, an INV instruction value generator 213, and a step-up ratio determiner 215, as illustrated in FIG. 2.

The target operating point determiner 211 determines an operating point (target operating point) which the motor 111 aims to achieve on the basis of the target torque Tt and the number of revolutions Nm. If a condition for the magnet temperature Tmg and the target operating point of the motor 111 determined on the basis of the target torque Tt and the number of revolutions Nm is met, the target operating point determiner 211 determines an operating point at which the output from the motor 111 is limited, compared with that at the determined operating point, to be the target operating point. Specifically, the control unit 207 sets the operation mode of the motor 111 to the output limited model. When the output limited mode is set, the target operating point determiner 211 determines the operating point at which the output from the motor 111 is limited on the basis of the magnet temperature Tmg of the permanent magnets to be the target operating point.

The above condition is that the target operating point is within a demagnetization occurring area and the magnet temperature Tmg exceeds an output limitation threshold value Tthh (for example, 150° C.). However, if the number of revolutions Nm of the motor 111 is lower than or equal to a threshold value Nth even when the target operating point is within the demagnetization occurring area and the magnet temperature Tmg is higher than or equal to a step-up ratio increasing threshold value Tthl (for example, 110° C.) and is lower than or equal to the output limitation threshold value Tthh, it is determined that the above condition is met. The step-up ratio increasing threshold value Tthl is lower than the output limitation threshold value Tthh.

Figure 3:
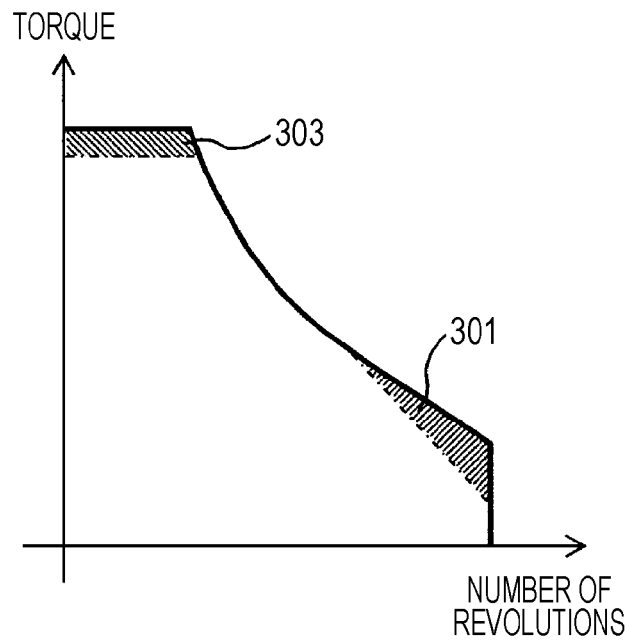
FIG. 3 illustrates an operation area of a motor.

The demagnetization occurring area corresponds to shaded areas in an operation area of the motor 111 illustrated in FIG. 3. When the motor 111 continues to operate at an operating point in the demagnetization occurring area, the demagnetization occurs in the permanent magnets due to an increase in the magnet temperature. As illustrated in FIG. 3, the operation area of the motor 111 includes two demagnetization occurring areas: a large number-of-revolutions side magnet temperature excessive area 301 and a small number-of-revolutions side phase current excessive area 303. In the large number-of-revolutions side magnet temperature excessive area 301, the magnet temperature increases because the motor 111 operates at a large number of revolutions and at a high output to cause the demagnetization in the permanent magnets. In the small number-of-revolutions side phase current excessive area 303, the phase current increases because the motor 111 operates at a high torque to cause the demagnetization in the permanent magnets.

The INV instruction value generator 213 generates an instruction value (INV instruction value) for the inverter 109 in order to operate the motor 111 at the target operating point. The INV instruction value generated by the INV instruction value generator 213 is supplied to the inverter 109.

The step-up ratio determiner 215 sets a step-up ratio n of the first converter 103 and the second converter 107 to a value corresponding to the magnet temperature Tmg if the condition that the target operating point of the motor 111 is within the demagnetization occurring area, the magnet temperature Tmg is higher than or equal to the step-up ratio increasing threshold value Tthl and is lower than or equal to the output limitation threshold value Tthh, and the number of revolutions Nm of the motor 111 is higher than the threshold value Nth is met. At this time, the control unit 207 sets the operation mode of the motor 111 to the step-up mode. The threshold value Nth is an intermediate value between a minimum number of revolutions in the magnet temperature excessive area 301 illustrated in FIG. 3 and a maximum number of revolutions in the phase current excessive area 303 illustrated in FIG. 3.

Data indicating the relationship between the step-up ratio n determined by the step-up ratio determiner 215 and the magnet temperature Tmg is stored in the memory 209. The step-up ratio determiner 215 refers to the data stored in the memory 209 to determine the step-up ratio n.

When the control unit 207 does not set the operation mode of the motor 111 to the step-up mode nor the output limited mode, the step-up ratio determiner 215 constantly sets the step-up ratio n to one. Specifically, the control unit 207 sets the operation mode of the motor 111 to the efficiency weighted mode and operates the motor 111 in accordance with the target operating point.

Figure 4:
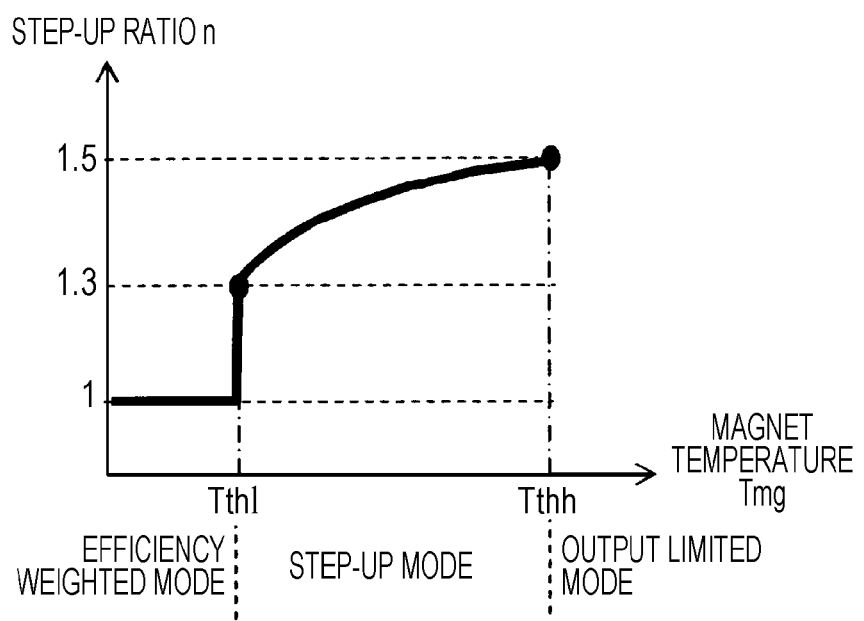
FIG. 4 is a graph illustrating an example of the relationship between a step-up ratio determined by a step-up ratio determiner and a magnet temperature.

FIG. 4 is a graph illustrating an example of the relationship between the step-up ratio n determined by the step-up ratio determiner 215 and the magnet temperature Tmg. As illustrated in FIG. 4, the step-up ratio n determined when the above condition is met is higher than 1.3 and a higher value is set for the step-up ratio n with the increasing magnet temperature Tmg. However, the step-up ratio n when the magnet temperature Tmg is at the threshold value Tthh is set to 1.5. In addition, after the magnet temperature Tmg exceeds the threshold value Tthl, the rate of change of the step-up ratio n with the increasing magnet temperature Tmg is low.

According to the relationship illustrated in FIG. 4, when the magnet temperature Tmg reaches the threshold value Tthl from a state in which the magnet temperature Tmg is lower than the threshold value Tthl in the state in which the motor 111 is being operated in the efficiency weighted mode, the operation mode of the motor 111 is switched to the step-up mode and the step-up ratio n is switched from one to 1.3. When the magnet temperature Tmg subsequently continues to increase, the step-up ratio n is gradually increased until the magnet temperature Tmg reaches the threshold value Tthh, as illustrated in FIG. 4. In other words, the step-up ratio determiner 215 determines a value corresponding to the magnet temperature Tmg illustrated in FIG. 4 to be the step-up ratio n.

The step-up ratio n determined by the step-up ratio determiner 215 is supplied to the first converter 103 and the second converter 107. The first converter 103 increases the DC voltage output from the battery 101 at the step-up ratio n, and the second converter 107 increases the DC voltage output from the FC stack 105 at the step-up ratio n. As a result, provided that the voltage input into the motor 111 when the step-up ratio n is equal to one is about 350 V, the voltage when the step-up ratio n is equal to 1.3 is about 450 V and the voltage when the step-up ratio is equal to 1.5 is about 550 V.

Figure 5:
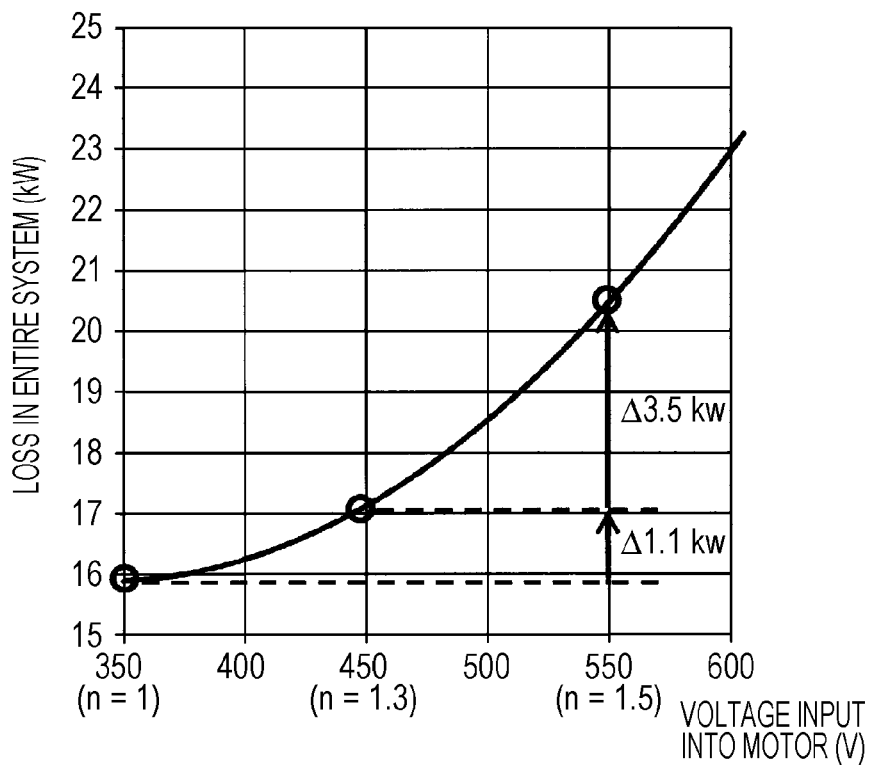
FIG. 5 is a graph illustrating an example of a loss characteristic of the entire system with respect to voltage input into the motor.

The loss in the entire system to drive the motor 111 is increased with the increasing step-up ratio n. FIG. 5 is a graph illustrating an example of a loss characteristic of the entire system with respect to the voltage input into the motor 111. When the step-up ratio n is switched from one to 1.3 to vary the voltage input into the motor 111 from 350 V to 450 V, the loss in the entire system is increased by 1.1 kW, as illustrated in FIG. 5. When the step-up ratio n is switched from 1.3 to 1.5 to vary the voltage input into the motor 111 from 450 V to 550 V, the loss in the entire system is increased by 3.5 kW, as illustrated in FIG. 5.

Although the loss in the entire system is increased with the increasing step-up ratio n in the above manner, it is possible to suppress an increase in the magnet temperature Tmg. Specifically, since field current in the motor 111 when the step-up ratio n is equal to one and the voltage input into the motor 111 is 350 V is large, the increasing rate of the magnet temperature Tmg is high. In contrast, since the field current in the motor 111 is made smaller when the step-up ratio n is increased to increase the voltage input into the motor 111, it is possible to suppress the increasing rate of the magnet temperature Tmg.

Figure 6:
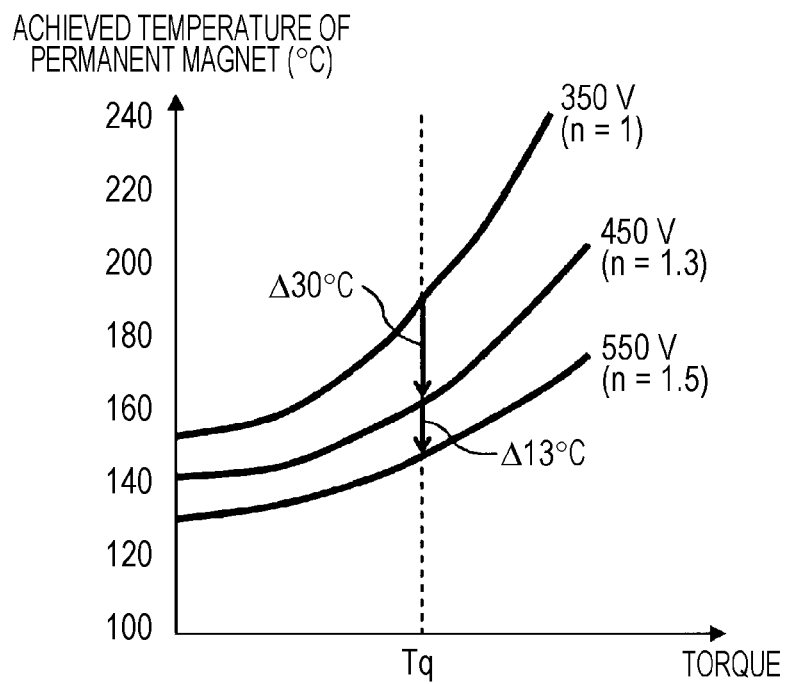
FIG. 6 is a graph illustrating exemplary achieved temperatures of permanent magnets with respect to a torque of the motor when the voltage input into the motor is varied between 350 V, 450 V, and 550 V.

FIG. 6 is a graph illustrating exemplary achieved temperatures of the permanent magnets with respect to the torque of the motor 111 when the voltage input into the motor 111 is varied between 350 V, 450 V, and 550 V. At a torque Tq of the motor 111, when the step-up ratio n is switched from one to 1.3 to vary the voltage input into the motor 111 from 350 V to 450 V, the achieved temperature of the permanent magnets in the motor 111 is decreased by about 30 degrees, as illustrated in FIG. 6. At the torque Tq, when the step-up ratio n is switched from 1.3 to 1.5 to vary the voltage input into the motor 111 from 450 V to 550 V, the achieved temperature of the permanent magnets in the motor 111 is decreased by about 13 degrees, as illustrated in FIG. 6. The increasing rate of the magnet temperature Tmg is low with the decreasing achieved temperature of the permanent magnets in the motor 111.

The relationship illustrated in FIG. 5 and the relationship illustrated in FIG. 6 indicate that the effect of suppressing the increase in the magnet temperature Tmg is relatively large although the loss in the entire system is increased by 1.1 kW when the step-up ratio n is switched from one to 1.3 and that the loss in the entire system is relatively large, that is, is equal to 3.5 kW although the effect of suppressing the increase in the magnet temperature Tmg is achieved when the step-up ratio n is switched from 1.3 to 1.5.

Accordingly, the step-up ratio determiner 215 increases the step-up ratio n from one to 1.3 at once when the magnet temperature Tmg reaches the threshold value Tthl, as illustrated in FIG. 4. In this case, the large effect of suppressing the increase in the magnet temperature Tmg is achieved with a small loss. However, when the magnet temperature Tmg continues to increase, the step-up ratio determiner 215 gradually increases the step-up ratio n from 1.3 to 1.5 until the magnet temperature Tmg reaches the threshold value Tthh. If the step-up ratio n is increased from 1.3 to 1.5 at once, the effect of suppressing the increase in the magnet temperature Tmg is not so large despite of a large loss. In addition, the increasing rate of the loss with respect to the amount of change of the step-up ratio n is increased with the increasing step-up ratio n to reduce the effect of suppressing the increase in the magnet temperature Tmg. Accordingly, continuously varying the step-up ratio n in accordance with the magnet temperature Tmg by the step-up ratio determiner 215 when the step-up ratio n is further increased from 1.3 allows the effect of suppressing the increase in the magnet temperature Tmg to be achieved while suppressing the increase in the loss in the entire system.

Figure 7:
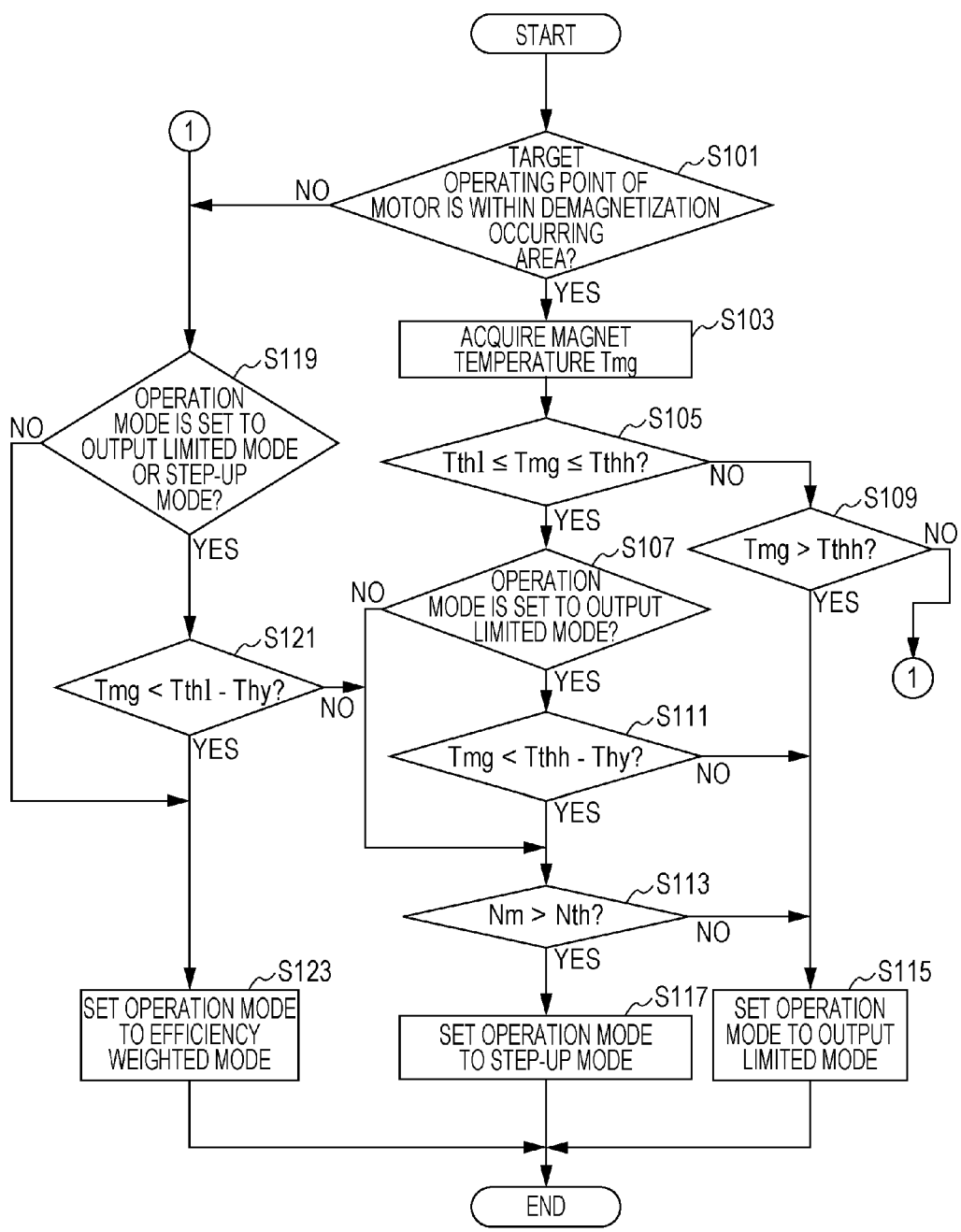
FIG. 7 is a flowchart illustrating an exemplary operational process of the management ECU.
Figure 8:
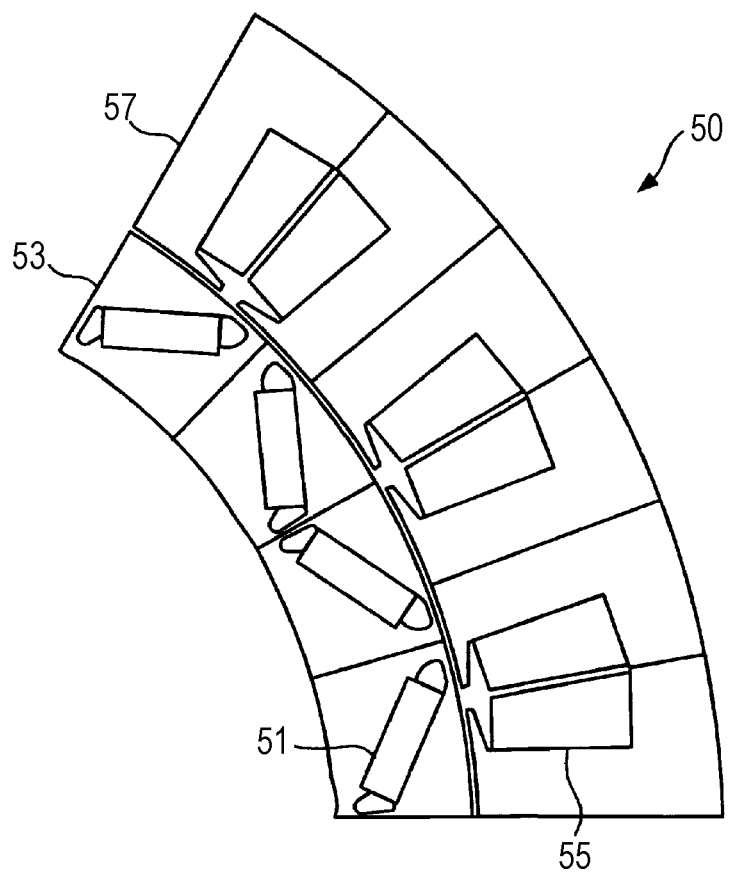
FIG. 8 is a partial cross-sectional view of a permanent magnet field motor in related art.

FIG. 7 is a flowchart illustrating an exemplary operational process of the management ECU 119. Referring to FIG. 7, in Step S101, the control unit 207 in the management ECU 119 determines whether the target operating point of the motor 111 is within the demagnetization occurring area. If the target operating point of the motor 111 is within the demagnetization occurring area (YES in Step S101), the process goes to Step S103. If the target operating point of the motor 111 is not within the demagnetization occurring area (NO in Step S101), the process goes to Step S119. In Step S103, the control unit 207 acquires the magnet temperature Tmg. In Step S105, the control unit 207 determines whether the magnet temperature Tmg is higher than or equal to the threshold value Tthl and is lower than or equal to the threshold value Tthh (Tthl≤Tmg≤Tthh). If Tthl≤Tmg≤Tthh (YES in Step S105), the process goes to Step S107. If the magnet temperature Tmg is lower than the threshold value Tthl or is higher than the threshold value Tthh (NO in Step S105), the process goes to Step S109. In other words, the process goes to Step S109 when Tmg<Tthl or Tmg>Tthh.

In Step S107, the control unit 207 determines whether the operation mode of the motor 111 is set to the output limited mode. If the operation mode of the motor 111 is set to the output limited mode (YES in Step S107), the process goes to Step S111. If the operation mode of the motor 111 is set to another mode (the step-up mode or the efficiency weighted mode) (NO in Step S107), the process goes to Step S113. In Step S109, the control unit 207 determines whether the magnet temperature Tmg is higher than the threshold value Tthh (Tmg>Tthh). If Tmg>Tthh (YES in Step S109), the process goes to Step S115. If Tmg<Tthh (NO in Step S109), the process goes to Step S119.

In Step S111, the control unit 207 determines whether the magnet temperature Tmg is lower than a value resulting from subtraction of a certain value Thy from the threshold value Tthh (for example, 150−5=145 V). If Tmg<Tthh−Thy (YES in Step S111), the process goes to Step S113. If Tmg≥Tthh−Thy (NO in Step S111), the process goes to Step S115. In Step S113, the control unit 207 determines whether the number of revolutions Nm of the motor 111 is higher than the threshold value Nth (Nm>Nth). If Nm>Nth (YES in Step S113), the process goes to Step S117. If Nm≤Nth (NO in Step S113), the process goes to Step S115.

When Nm>Nth, the operating point of the motor 111 seems to be within the large number-of-revolutions side magnet temperature excessive area 301. In the large number-of-revolutions side magnet temperature excessive area 301, the increase in the step-up ratio allows the increase in the magnet temperature to be suppressed, as described above with reference to FIG. 4 to FIG. 6, to suppress the demagnetization. Accordingly, in Step S117, the control unit 207 sets the operation mode of the motor 111 to the step-up mode. In the step-up mode, the step-up ratio determiner 215 in the control unit 207 determines the step-up ratio n corresponding to the magnet temperature Tmg to vary the step-up ratio of the first converter 103 and the second converter 107.

When Nm≤Nth, the operating point of the motor 111 seems to be within the small number-of-revolutions side phase current excessive area 303 and the increase in the step-up ratio does not suppress the demagnetization in the small number-of-revolutions side phase current excessive area 303. Accordingly, in Step S115, the control unit 207 sets the operation mode of the motor 111 to the output limited mode.

As described above, even when the magnet temperature Tmg is higher than or equal to the threshold value Tthl and is lower than or equal to the threshold value Tthh (Tthl≤Tmg≤Tthh), the operation mode of the motor 111 is set to the step-up mode if the number of revolutions Nm of the motor 111 is higher than the threshold value Nth (Nm>Nth) and is set to the output limited mode if the number of revolutions Nm of the motor 111 is lower than or equal to the threshold value Nth (Nm≤Nth). Accordingly, the threshold value Tthl of the magnet temperature Tmg is a threshold value when the operation mode of the motor 111 is set to the step-up mode and is also a threshold value when the operation mode of the motor 111 is set to the output limited mode. When Nm≤Nth, the threshold value Tthl of the magnet temperature Tmg may be made lower than that when Nm>Nth. As described above, since the increase in the step-up ratio does not suppress the demagnetization when the operating point of the motor 111 is within the small number-of-revolutions side phase current excessive area 303, the output limitation is the only method as the countermeasure against the increase in the magnet temperature. In other words, the toughness against the increase in the magnet temperature is low. Accordingly, setting the threshold value Tthl to a low value when Nm≤Nth increases the possibility that the operation mode of the motor 111 is set to the output limited mode.

In Step S119, the control unit 207 determines whether the operation mode of the motor 111 is set to the output limited mode or the step-up mode. If the operation mode of the motor 111 is set to the output limited mode or the step-up mode (YES in Step S119), the process goes to Step S121. If the operation mode of the motor 111 is set to the efficiency weighted mode (NO in Step S119), the process goes to Step S123. In Step S121, the control unit 207 determines whether the magnet temperature Tmg is lower than a value resulting from subtraction of the certain value Thy from the threshold value Tthl (for example, 110−5=105 V). If Tmg<Tthl−Thy (YES in Step S121), the process goes to Step S123. If Tmg≥Tthl−Thy (NO in Step S121), the process goes to Step S113. In Step S123, the control unit 207 sets the operation mode of the motor 111 to the efficiency weighted mode.

As described above, according to the present embodiment, even in a state in which the demagnetization occurs in the permanent magnets due to the increase in the magnet temperature because the operating point of the motor 111 is within the demagnetization occurring area, the step-up ratio of the first converter 103 and the second converter 107 is increased. Since the increase in the step-up ratio suppresses the increase in the magnet temperature although the loss in the entire system is slightly increased, it is possible for the motor 111 to continue to operate at the current operating point without a reduction in output.

In the present embodiment, the motor ECU 113 estimates the magnet temperature of the motor 111 and the management ECU 119 uses the estimated value as the magnet temperature. When a sensor to detect the temperature of the permanent magnets is provided in the motor 111, the management ECU 119 may use a value detected by the sensor as the magnet temperature.

Although the battery 101 and the FC stack 105 are provided as energy sources to supply the electric power to the motor 111 in the present embodiment, as illustrated in FIG. 1, a vehicle provided with only one of the energy sources may be adopted. In this case, in a vehicle provided with only the battery 101 as the energy source, the management ECU 119 may acquire data about the state of charge (SOC) indicating the state of the battery 101 to vary the value of a normal maximum rated voltage used in Step S105 in FIG. 7 in accordance with the value of the SOC. When the battery 101 is composed of lithium-ion cells, the voltage output from the battery 101 tends to decrease with the decreasing SOC. Accordingly, the management ECU 119 may decrease the value of the normal maximum rated voltage in accordance with the decrease in the SOC of the battery 101 composed of the lithium-ion cells.

According to the embodiment, a control apparatus in a motor drive system including a motor (for example, the motor 111 in the embodiment) that includes a permanent magnet in a rotor or a stator, a power supplying unit (for example, the battery 101 in the embodiment) that outputs direct current voltage, and a voltage step-up unit (for example, the first converter 103 and the second converter 107 in the embodiment) that increases the voltage output from the power supplying unit at a certain step-up ratio includes a magnet temperature acquiring unit (for example, the motor ECU 113 in the embodiment) configured to estimate or detect a temperature of the permanent magnet included in the motor; and a step-up ratio determining unit (for example, the step-up ratio determiner 215 in the embodiment) configured to determine the certain step-up ratio in accordance with the temperature of the permanent magnet estimated or detected by the magnet temperature acquiring unit.

When the temperature of the permanent magnet reaches a first magnet-temperature threshold value from a low-temperature state in which the temperature of the permanent magnet is lower than the first magnet-temperature threshold value, the step-up ratio determining unit may vary the certain step-up ratio to a first step-up ratio higher than the step-up ratio that is set in the low-temperature state and may continuously vary the certain step-up ratio in accordance with the temperature of the permanent magnet if the temperature of the permanent magnet is higher than the first magnet-temperature threshold value.

When the step-up ratio determining unit continuously varies the certain step-up ratio in accordance with the temperature of the permanent magnet, a rate of change of the certain step-up ratio with the increasing temperature of the permanent magnet may be low.

The step-up ratio determining unit may determine the certain step-up ratio in accordance with the temperature of the permanent magnet if a number of revolutions of the motor is higher than or equal to a certain first number-of-revolutions threshold value and the temperature of the permanent magnet is higher than or equal to the first magnet-temperature threshold value.

The step-up ratio determining unit may determine the certain step-up ratio in accordance with the temperature of the permanent magnet if a number of revolutions of the motor is higher than or equal to a certain first number-of-revolutions threshold value and the temperature of the permanent magnet is higher than or equal to the first magnet-temperature threshold value.

If the temperature of the permanent magnet is higher than or equal to a second magnet-temperature threshold value higher than the first magnet-temperature threshold value, an output from the motor may be limited.

If the number of revolutions of the motor is lower than the first number-of-revolutions threshold value or is lower than a second number-of-revolutions threshold value lower than the first number-of-revolutions threshold value and the temperature of the permanent magnet is lower than a third magnet-temperature threshold value lower than the second magnet-temperature threshold value, the output from the motor may be limited.

According to the embodiment, since varying the step-up ratio in accordance with the temperature of the permanent magnet in the motor allows an effect of suppressing the increase in the magnet temperature to be achieved, it is possible to cause the motor to output power at constant rating while suppressing demagnetization in the permanent magnet.

When the temperature of the permanent magnet reaches the first threshold value, it is possible to achieve the large effect of suppressing the increase in the magnet temperature with a small loss even if the value of the step-up ratio is increased at once. In addition, when the temperature of the permanent magnet subsequently continues to increase, the effect of suppressing the increase in the magnet temperature is not so large despite the fact that the loss in the entire motor drive system is large even if the step-up ratio is further increased to a higher value at once. Accordingly, continuously varying the step-up ratio in accordance with the temperature of the permanent magnet allows the effect of suppressing the increase in the magnet temperature to be achieved while suppressing the increase in the loss in the entire system.

Since the increasing rate of the loss in the entire system with respect to the amount of change of the step-up ratio is increased with the increasing step-up ratio to reduce the effect of suppressing the increase in the magnet temperature. Accordingly, the rate of change of the step-up ratio with the increasing temperature of the permanent magnet is set to a low value.

When the temperature of the permanent magnet is high, limiting the output from the motor allows the increase in the temperature of the permanent magnet to be suppressed.

When the temperature of the permanent magnet seems to increase due to the operation of the motor, limiting the output from the motor allows the increase in the temperature of the permanent magnet to be suppressed.

Obviously, numerous modifications and variations of the present invention are possible in light of the above teachings. It is therefore to be understood that within the scope of the appended claims, the invention may be practiced otherwise than as specifically described herein.

What is claimed is:

1. A control apparatus in a motor drive system, the control apparatus comprising:
    a magnet temperature acquiring device configured to estimate or detect a temperature of a permanent magnet provided in a rotor or a stator of a motor of the motor drive system, the motor drive system including a power supplying device to output direct current voltage, and a voltage step-up device to increase, at a certain step-up ratio, the direct current voltage which is output from the power supplying device; and
    a step-up ratio determining device configured to determine the certain step-up ratio in accordance with the temperature of the permanent magnet estimated or detected by the magnet temperature acquiring device.

2. The control apparatus according to claim 1,
wherein, when the temperature of the permanent magnet reaches a first magnet-temperature threshold value from a low-temperature state in which the temperature of the permanent magnet is lower than the first magnet-temperature threshold value, the step-up ratio determining device varies the certain step-up ratio to a first step-up ratio higher than a step-up ratio that is set in the low-temperature state, and
wherein the step-up ratio determining device continuously varies the certain step-up ratio in accordance with the temperature of the permanent magnet if the temperature of the permanent magnet is higher than the first magnet-temperature threshold value.

3. The control apparatus according to claim 2,
wherein, when the step-up ratio determining device continuously varies the certain step-up ratio in accordance with the temperature of the permanent magnet, a rate of change of the certain step-up ratio decreases as the temperature of the permanent magnet increases.

4. The control apparatus according to claim 1,
wherein the step-up ratio determining device determines the certain step-up ratio in accordance with the temperature of the permanent magnet if a number of revolutions of the motor is higher than or equal to a first number-of-revolutions threshold value and if the temperature of the permanent magnet is higher than or equal to the first magnet-temperature threshold value.

5. The control apparatus according to claim 2,
wherein the step-up ratio determining device determines the certain step-up ratio in accordance with the temperature of the permanent magnet if a number of revolutions of the motor is higher than or equal to a first number-of-revolutions threshold value and if the temperature of the permanent magnet is higher than or equal to the first magnet-temperature threshold value.

6. The control apparatus according to claim 4,
wherein, if the temperature of the permanent magnet is higher than or equal to a second magnet-temperature threshold value higher than the first magnet-temperature threshold value, an output from the motor is limited.

7. The control apparatus according to claim 6,
wherein, if the number of revolutions of the motor is lower than the first number-of-revolutions threshold value or is lower than a second number-of-revolutions threshold value lower than the first number-of-revolutions threshold value and if the temperature of the permanent magnet is lower than a third magnet-temperature threshold value lower than the second magnet-temperature threshold value, the output from the motor is limited.

8. A control apparatus in a motor drive system, the control apparatus comprising:
magnet temperature acquiring means for estimating or for detecting a temperature of a permanent magnet provided in a rotor or a stator of a motor of the motor drive system, the motor drive system including a power supplying device to output direct current voltage, and a voltage step-up device to increase, at a certain step-up ratio, the direct current voltage which is output from the power supplying device; and
step-up ratio determining means for determining the certain step-up ratio in accordance with the temperature of the permanent magnet estimated or detected by the magnet temperature acquiring means.

9. A method of controlling a motor drive system, the method comprising:
estimating or detecting a temperature of a permanent magnet provided in a rotor or a stator of a motor of the motor drive system, the motor drive system including a power supplying device to output direct current voltage, and a voltage step-up device to increase, at a certain step-up ratio, the direct current voltage which is output from the power supplying device; and
determining the certain step-up ratio in accordance with the temperature of the permanent magnet.

* * * * *